United States Patent Office 3,460,912
Patented Aug. 12, 1969

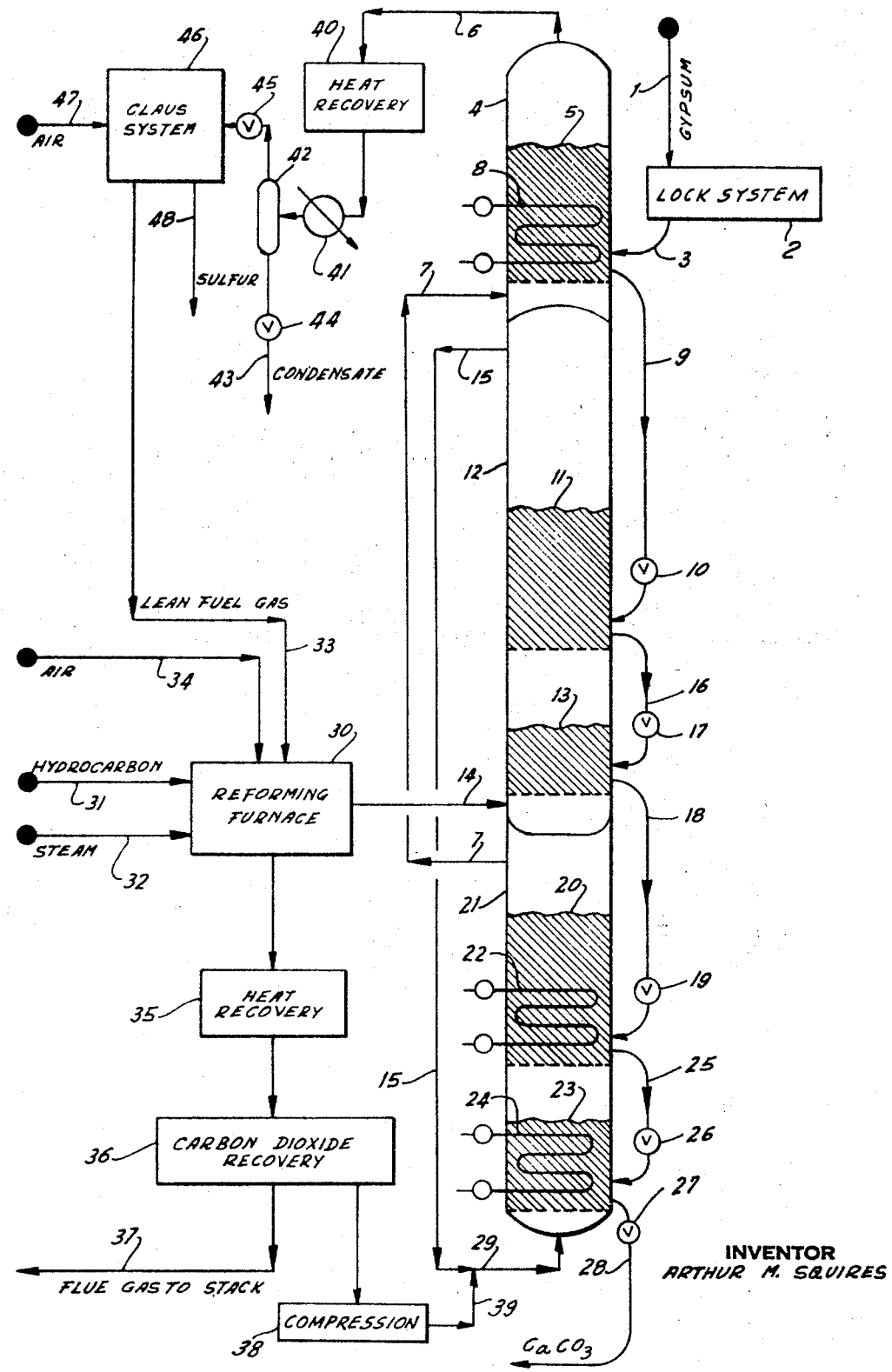

3,460,912
PRODUCING SULFUR FROM CALCIUM SULFATE
Arthur M. Squires, 245 W. 104th St.,
New York, N.Y. 10025
Continuation-in-part of application Ser. No. 556,434,
June 9, 1966. This application Aug. 21, 1968, Ser.
No. 754,262
Int. Cl. C01b 17/04, 17/02
U.S. Cl. 23—224                  5 Claims

ABSTRACT OF THE DISCLOSURE

In a process useful for preparing sulfur from $CaSO_4$, $H_2$ and CO from a steam-hydrocarbon catalytic reforming furnace are reacted with the $CaSO_4$ to yield CaS and a gas enriched in steam and $CO_2$. The CaS is reacted with the same steam and $CO_2$ (sometimes with an addition of further $CO_2$) at a temperature below about 1300° F. and at a pressure greater than about 4 atmospheres, with removal of heat. The $H_2S$ which results is converted to elemental sulfur. The gas-solid reactions are conducted in fluidized beds.

Background of the invention

This application is a continuation-in-part of my application Ser. No. 556,434, filed June 9, 1966, now U.S. Patent No. 3,402,998.

A number of proposals would use various solid and gaseous fuels to derive $SO_2$ or $H_2S$ or elemental sulfur from $CaSO_4$. For examples, see U.S. Patents 2,687,946 (1954); 2,687,947 (1954); 2,740,691 (1956); 2,863,726 (1958); 2,970,893 (1961); 3,087,790 (1963); and 3,148,-950 (1964). See also the paper given by J. T. Graves and T. D. Heath at Los Angeles meeting of American Institute of Mining, Metallurgical and Petroleum Engineers, Feb. 21, 1967; these authors would convert $CaSO_4$ to CaS in a bed fluidized at substantially atmospheric pressure by $H_2$ and CO at about 1560° F., and would recover $H_2S$ by reacting CaS and liquid water and $CO_2$. Their proposal had disadvantages, including: no useful heat can be recovered from the reaction of CaS with liquid water and $CO_2$; the $CaCO_3$ formed by this reaction is extremely fine, requires settling or filtration for removal from the water, and is difficult to dispose of; and the process needs substantially pure oxygen, which is expensive, for preparing the $H_2$ and CO.

My aforementioned application Ser. No. 556,434 discloses that $H_2S$ can be recovered from CaS at a concentration suitable for conversion to elemental sulfur in the well-known Clause system by reacting CaS with steam and $CO_2$ at a pressure higher than about 4 atmospheres and at a temperature preferably below about 1300° F. [see also my paper in Advances in Chemistry Series, Number 69 (1967), page 205].

Description of the invention

This invention relates to the production of sulfur from $CaSO_4$.

An object of the invention is to provide an economic method of recovering elemental sulfur from anhydrite or gypsum, either native or a waste from an operation in which phosphate rock is treated with sulfuric acid.

Another object is to provide an economic method of recovering elemental sulfur from gases containing $SO_2$.

According to the invention, there is provided a process useful in the preparation of hydrogen sulfide or sulfur, by reacting a solid containing calicum sulfate with hydrogen and carbon monoxide to yield calcium sulfide, steam, and carbon dioxide.

$CaSO_4 + 4H_2 = CaS + 4H_2O$    Reaction 1
$CaSO_4 + 4CO = CaS + 4CO_2$    Reaction 2

The calcium sulfide is reacted with steam and carbon dioxide at a temperature below about 1300° F. and at a pressure greater than about 4 atmospheres to produce calcium carbonate and hydrogen sulfide.

$CaS + H_2O + CO_2 = CaCO_3 + H_2S$    Reaction 3

The steam and carbon dioxide for Reaction 3 are derived at least in major part from the gases arising from Reactions 1 and 2. The reactions are preferably conducted in fluidized beds. Heat from Reaction 3 may be used ot raise or superheat high-pressure steam.

The hydrogen sulfide is advantageously converted to elemental sulfur by reacting one-third of the $H_2S$ in a combustion with air to form $SO_2$ and by treating the remaining $H_2S$ with the $SO_2$ according to a reaction here termed the "Claus reaction":

$2H_2S + SO_2 = 3S + 2H_2O$    Claus reaction

Systems employed catalytic beds for conducting this reaction are well known; in some of these systems the conversion of part of the $H_2S$ to $SO_2$ is carried out more or less simultaneosuly with the Claus reaction. My co-pending application entitled, "Process and Apparatus for Desulfurizing Fuels," filed simultaneously herewith, discloses a novel procedure for conducting the Claus reaction, in which the $H_2S$ and $SO_2$ are reacted at high pressure by bubbling the gases up through a pool of water at a little below 320° F.

The $H_2$ and CO for Reactions 1 and 2 may be advantageously produced by reforming a light hydrocarbon, such as methane or propane or a light naphtha, with steam in a catalytic reforming furnace operating at a pressure greater than about 6 atmospheres. It is advantageous to conduct the reforming operation with feed of the light hydrocarbon in appreciable excess beyond the amount required stiochiometrically to yield the required quantity of $H_2$ and CO for Reactions 1 and 2, and with a conversion such that the reformed gas contains a significant amount of unreformed methane as well as $H_2$ and CO. When this is done, the catalytic reforming furnace is cheaper to build and operate. The unreformed methane passes along with the $H_2$ and CO into the process of the instant invention, not participating in Reactions 1, 2, and 3 which occur therein. Accordingly, the methane is present in the gas containing $H_2S$ which arises from Reaction 3. By keeping the temeprature in the aforementioned combustion of one-third of the $H_2S$ with air below about 1000° F., one can ensure that this methane will pass through the combustion intact, so that the offgas from the Claus reaction will constitute a lean fuel gas. This gas is then advantageously used as at least a major part of the fuel to the catalytic reforming furnace.

If natural gas is reformed to provide the $H_2$ and CO for Reactions 1 and 2, the $CO_2$ arising from Reaction 2 is generally not sufficient in amount for conducting Reaction 3. In this situation, $CO_2$ must be added to the gases from Reactions 1 and 2. This $CO_2$ is advantageously provided by removing $CO_2$ by known means from the flue gas leaving the catalytic reforming furnace. If a light naphtha is reformed to provide $H_2$ and CO, an addition of $CO_2$ is not generally required.

Each of Reactions 1, 2, and 3 is exothermic. A number of the aforemntioned prior-art proposals involved endothermic reactions with solids at high temperature, and thereby incurred heavy expense to provide for large inputs of heat to such reactions. An advantage of the process of the instant invention over these earlier proposals is that no additions of heat to solids at high temperature are required. Although the reforming of a hydrocarbon with steam is endothermic, commercial means for supplying heat to reforming are highly developed and reasonable in cost.

In Reaction 3, a higher concentration of $H_2S$ can be produced, for a given operating pressure and given inputs of steam and $CO_2$, by operating at a lower temperature. The preferred temperature of the operation should be selected in light of this fact and the reaction kinetics and the temperature level at which byproduct heat from the reaction is desired, this heat being advantageously used to raise or to superheat steam at a high pressure, such as 1800 pounds per square inch absolute (p.s.i.a.) or even higher. A temperature between about 900° F. and 1300° F. is satisfactory for Reaction 3, and a temperature of about 1100° F. is preferred. At the preferred temperature, a pressure higher than about 4 atmospheres is needed to obtain a concentration of $H_2S$ (in dry gas) satisfactory for feed to a system for conducting the Claus reaction, without need to use undue quantities of excess steam. A pressure higher than about 250 p.s.i.a. is preferred.

Reactions 1 and 2 should be conducted at substantially the same elevated pressure used for Reaction 3, so that the solid containing CaS may be easily transferred from Reactions 1 and 2 to Reaction 3, and so that steam and $CO_2$ which result from Reactions 1 and 2 respectively may be employed in Reaction 3 without need for an interposed compression step.

By conducting at least a part of Reaction 3 in a bed operating at about 1300° F., at least a part of Reactions 1 and 2 may be conducted substantially simultaneously, for all practical purposes, with this part of Reaction 3. In principle, all of the reactions could be conducted practically simultaneously throughout their entire course if the reaction conditions are carefully selected and if sufficient time is allowed. However, I have found it advantageous to conduct at least a major part of Reactions 1 and 2 at temperatures above 1300° F., which are relatively disadvantageous for Reaction 3.

Preferably, Reactions 1 and 2 are conducted in at least two superposed fluidized beds operating adiabatically, the lowermost bed being fluidized by the gaseous reaction product from the catalytic reforming furnace already mentioned, and the flow of solid and gases through the several fluidized beds and occurring in a counter-current manner. Solid from the lowermost bed would pass into a fluidized bed constituting the uppermost of at least two fluidized beds for conducting Reaction 3, at least one of the beds being supplied with cooling surface. The lowermost bed for Reaction 3 would be fluidized at least in major part by the gaseous reaction product from the uppermost of the beds for Reactions 1 and 2, the flow of solid and gases through the several fluidized beds for Reaction 3 occurring in a counter-current manner.

The instant invention may be advantageously used to prepare elemental sulfur from anhydrite or gypsum, either natural or a waste product.

The invention is also useful to recover elemental sulfur from the $CaSO_4$ produced by contacting a calcium-containing solid with a gas containing $SO_2$, such as the stack gas from an oil- or coal-fired boiler or the offgas from sulfide-ore metallurgy. Limestone or dolomite may be used in several ways to remove $SO_2$ from the gases, but hitherto there has been no economic way to recover elemental sulfur from the calcium sulfate which results.

A bed of crushed dolomite rock has the power to remove $SO_2$ from an oxygen-containing flue gas traversing the bed at a temperature higher than about 1000° F.—see Chemical Engineering for Nov. 20, 1967, page 135. The bed of rock could advantageously be arranged and operated according to the teachings of my U.S. Patent 3,296,775 (Jan. 10, 1967) or, preferably, to those of my co-pending application Ser. No. 625,692, filed Mar. 24, 1967, in order that "spent" solid bearing $CaSO_4$ may be conveniently removed from the bed, without removing unreacted solid. The solid bearing $CaSO_4$ could be treated by the process of the instant invention. The half-calcined dolomite which would be thereby produced could be returned to the bed for removing $SO_2$ from the flue gas.

A finely pulverized solid, derived from limestone or dolomite, can remove $SO_2$ from flue gas if the solid is injected into the furnace of a boiler in an amount several times larger than the stoichiometric for reaction of both CaO and MgO, either contained in the solid or derivable therefrom by calcination reactions, to the respective sulfates—see Chemie Ingenieur Technik, vol. 39 (1967), page 607. Alternatively, the finely pulverized solid may be injected into the boiler in approximately the stoichiometric amount, and the flue gas together with the solid may be passed into a wet scrubber, thereby effecting substantially complete removal of $SO_2$—see the paper given by A. L. Plumley, O. D. Whiddon, F. W. Shutko, and J. Jonakin at the American Power Conference, Chicago, Ill., Apr. 25–27, 1967. A solid containing $CaSO_4$ could be recovered from either of these alternative modes of operation. The solid could then be treated by the process of the instant invention, to yield a solid containing $CaCO_3$ suitable for re-injection into the boiler.

When dolomite is used to prepare solids for the just-described procedures for removing $SO_2$ from boiler flue gas, the solid recovered from the procedures will in general contain $MgSO_4$ as well as $CaSO_4$. If such a solid were treated by the process of the instant invention, the $MgSO_4$ would be converted to MgO and $H_2S$ as an incidental result of the operation.

Description of the drawing

The invention including various novel features will be more fully understood by reference to the accompanying drawing and the following description of a preferred embodiment illustrated schematically therein. The embodiment is for recovering elemental sulfur values from gypsum.

Description of a preferred embodiment

I now describe the drawing, and, concurrently, provide a numerical example which illustrates a preferred embodiment of the process of the invention. I first describe in detail the flow of the solids through the process, and then the flow of the gases.

In unit time (which may, for example, be one hour), 585 pound-moles of comminuted gypsum, $CaSO_4 \cdot 2H_2O$, are supplied via line 1 to conventional lock means 2 for raising the pressure of the gypsum. The gypsum is delivered at about 300 p.s.i.a. from lock means 2 to pressure vessel 4 via line 3. Vessel 4 houses fluidized bed 5, which operates at about 400° F. and discharges gas at about 294 p.s.i.a. and 400° F. Bed 5 is fluidized by a gas at about 1000° F., supplied to vessel 4 via line 7. Gypsum is dehydrated in bed 5, the major part of the heat requirement for the heating and the dehydrating of the gypsum being supplied by the cooling of gas from line 7 to 400° F. A small part of the heat requirement is supplied by condensing high-pressure steam in heat-exchange tubing 8 immersed in bed 5. The flow of gypsum to bed 5 via line 3 is preferably substantially continuous.

The gypsum is preferably between about 0.1 and 0.01 inch in size, but gypsum of larger or smaller particle size, within a wide range, may be used. For example, particles up to about 0.5 inch are satisfactory, and particles smaller than 0.0025 inch may also be treated.

Dehydrated gypsum is withdrawn intermittently from bed 5 via line 9 and deliverd to fluidized bed 11 housed in pressure vessel 12. The transfer is effected by opening valve 10 in line 9 for an interval of time. Vessel 12 also houses fluidized bed 13, situated directly below bed 11. Fluidized bed 13 is fluidized by a gas at about 1500° F., supplied to vessel 12 via line 14, and bed 11 is fluidized by the offgas from bed 13. The dehydrated gypsum is reduced substantially completely to CaS in beds 11 and 13.

Solid comprising substantially CaS is withdrawn intermittently from fluidized bed 13 via line 18 and delivered to fluidized bed 20 housed in vessel 21. The transfer is effected by opening valve 19 in line 18 for an interval of time. Each transfer from bed 13 to bed 20 is preferably a substantially complete transfer of the inventory of bed 13. After bed 13 has been emptied by the transfer, a new charge of solid is transferred to bed 13 from bed 11 via line 16, by opening valve 17 for an internal of time. During a period between transfers of solid from bed 11 to bed 13, the inventory of bed 11 grows on account of the preferably more frequent transfers of dehydrated gypsum from bed 5 via line 9.

Vessel 21 also houses fluidized bed 23 situated directly below bed 20. Fluidizing gas to bed 23 is supplied to vessel 21 via line 29, and bed 20 is fluidized by offgas from bed 23. Beds 20 and 23 contain heat-transfer surfaces 22 and 24 respectively, whereby heat is removed from both beds for raising or superheating stream at high pressure. The rates of heat removal are regulated to control the temperatures of beds 20 and 23 at about 1000° F. and 1100° F. respectively. The CaS is substantially converted to $CaCO_3$ in beds 20 and 23.

Solid comprising substantially $CaCO_3$ is withdrawn intermittently from fluidized bed 23 via line 28 and discharged as a product of the process of the instant invention. The withdrawn is effected by opening valve 27 in line 28 for an interval of time. The withdrawal from bed 23 is preferably a substantially complete draining of the inventory of bed 23. After bed 23 has been emptied by the withdrawal, a new charge of solid is transferred to bed 23 from bed 20 via line 25, by opening valve 26 for an interval of time.

The above-described transfer of solid from bed 13 to bed 20 is preferably conducted immediately following a transfer of solid from bed 20 to bed 23.

Having described the flow of solids through the process, I next describe the flow of gases. In unit time, 1050 pound-moles of methane and 2700 of steam, each at 450 p.s.i.a., enter catalytic reforming furnace 30 via lines 31 and 32 respectively. Heat to the furnace is supplied by combustion of a lean fuel gas with air, furnished via lines 33 and 34 respectively. Reformed gas product leaves the reforming furnace at 1500° F. and 344 p.s.i.a via line 14, and comprises 400 pound-moles of unreformed $CH_4$, 377 CO, 2223 $H_2$, 273 $CO_2$ and 1777 $H_2O$.

Heat is recovered from the combustion products from the reforming furnace in heat-recovery means 35, the heat being advantageously used, for example, in raising steam or in heating water. Carbon dioxide is removed from the combustion products, in an amount of 590 moles, by recovery means 36, and the remaining combustion products are sent to a stack via line 37. The 590 moles of $CO_2$ from means 36 are supplied to compression means 38, which deliver the $CO_2$ at 324 p.s.i.a to line 39.

Offgas from fluidized bed 11, leaving vessel 12 via line 15, is blended in line 29 with the $CO_2$ from line 39. Line 29 supplies fluidizing gas for bed 23 to vessel 21. Offgas from fluidized bed 20 leaves vessel 21 via line 7.

The offgas from bed 5, leaving vessel 4 via line 6, comprises 583.3 pound-moles of $H_2S$, 1.7 COS, 400 $CH_4$, 222.3 $H_2$, 37.7 CO, 4364.4 $H_2O$, and 615.6 $CO_2$. Heat is recovered from this gas, by cooling the gas and condensing steam, in heat-recovery means 40. Means 40 may raise steam at low pressure, or advantageously some of the heat available to means 40 may be used to expel $CO_2$ from an alkaline liquor, such as a liquor which might be used in means 36 to absorb $CO_2$ from combustion products. Gases from means 40 are cooled to about 100° F. by heat exchange against cooling water in cooler 41. Liquid water is separated from the gas in separating drum 42, and water condensate, in an amount of about 4357.7 moles, is withdrawn from the process via line 43 across valve 44. The gases from drum 42 are let down to a pressure a little above atmospheric across valve 45, and are committed to Claus system 46 for production of elemental sulfur, which is delivered from the process via line 48. Air is supplied to the Claus system from line 47. The Claus system is operated so that temperatures of the reacting gases remain below about 1000° F., thereby preserving combustion-gas values present in the gases save for $H_2S$. Accordingly, the offgas from the Claus system is a lean fuel gas, and is delivered to the combustion in reforming furnace 30 via line 33.

Beds 11 and 13 are primarily for conducting Reactions 1 and 2, although Reaction 3 may occur to a relatively smaller degree. Beds 20 and 23 are for conducting Reaction 3. The flows of gases and solid through beds 11 and 13 are seen to be counter-current, as are also the flows of gases and solid through beds 20 and 23.

Although the transfers of solids (save for the feed of gypsum to bed 5) are intermittent, the flows of the gases are continuous and the composition of the gas in line 6 will not change very much from moment to moment during the operation. When bed 13 is momentarily empty, its inventory having just been transferred to bed 20, the solid in bed 11 can serve to maintain continuity in the carrying out of Reactions 1 and 2. Similarly, when bed 23 is momentarily empty, a sufficient inventory of solids in bed 20 can sustain Reaction 3.

The transfers of the solids among the several fluidized beds may optionally be conducted in a continuous manner, but I have found that the above-described procedures, employing intermittent transfers, have the advantage that a higher conversion of $CaSO_4$ to CaS and a higher conversion of CaS to $CaCO_3$ may be accomplished in a given vessel volume. Additional beds could be provided to aid in achieving higher conversions, but I believe that the number of beds illustrated in the drawing will generally be found satisfactory.

As indicated in the drawing, beds 11 and 13 are preferably operated adiabatically. The temperatures of these beds will vary in time during an interval between transfers of solid. The exact temperatures of these beds will depend upon their absolute size, upon the pressure level and composition of the gases supplied via line 14, upon the relative sizes of the beds, and upon the frequency of solid transfers—all factors which affect the degree of conversion of the gases supplied via line 14 and the degree to which Reaction 3 occurs in beds 11 and 13. In general, the temperature of bed 13 will be about 1500° F., and the temperature of bed 11 will be between about 1250° and 1400° F.

The heat economy of the new process is outsanding. In the example, the 1050 moles of methane entering via line 31 provide the entire fuel requirement, which amounts to about 48 million British thermal units (B.t.u.'s) per long ton of sulfur produced, reckoned from the higher heating value of methane. Heat recoveries in exchangers 22 and 24, in means 35 and 40, and in a Claus system of typical design are sufficient for raising steam for the supply in line 32, for raising the steam condensed in exchanger 8, and for the typical heat requirements of typical means 36 for recovery of $CO_2$. In addition, approximately 8 million B.t.u.'s of valuable heat may be recovered for other uses, per long ton of sulfur.

My invention is not limited to the particular embodiment of the drawing.

A moving bed might be used instead of the fluidized beds of vessels 12 and 21, although I prefer fluidized beds on account of the greater ease of removing heat from such beds and of controlling temperatures therein.

Other light hydrocarbons may be substituted for some or all of the methane in line 31.

The reducing gases for bed 13 may sometimes advantageously be produced by a partial combustion of a residual oil. For example, residual oil could be injected into bed 13 (via nozzles not shown in the drawing), and a mixture of steam and oxygen could be supplied to vessel 12 via line 14 (reforming furnace 30 being omitted).

The gas from separating drum 42 could advantageously be heated and let down in pressure across a power-developing expansion turbine.

If a need existed for power as well as sulfur, a gas-turbine power plant may advantageously be provided, and the Claus system may with advantage be operated at substantially the elevated pressure of the gases from drum 42. Air to the Claus system would be bled from the air compressor of the gas-turbine power plant, and offgas from the Claus system could be supplied to the combustion chamber of this plant.

Other alternatives, which do not depart from the spirit of the invention, will be evident to those skilled in the art.

I claim:

1. A process useful in the preparation of hydrogen sulfide or sulfur, comprising the steps:
   (a) reacting a solid containing calcium sulfate with a gas containing hydrogen and carbon monoxide to yield a solid containing calcium sulfide and a gas enriched in steam and carbon dioxide, and subsequently
   (b) reacting said solid containing calcium sulfide with steam and carbon dioxide at a pressure greater than about 4 atmospheres and at a temperature below about 1300° F., to produce calcium carbonate and a gas containing hydrogen sulfide, said steam and carbon dioxide reacting with said solid containing calcium sulfide being derived at least in major part from said gas enriched in steam and carbon dioxide.

2. The process of claim 1 in which said gas containing hydrogen and carbon monoxide is produced by reforming a light hydrocarbon with steam in a catalytic reforming furnace to yield said gas containing hydrogen and carbon monoxide at a pressure greater than about 6 atmospheres.

3. The process of claim 2 in which also
   said light hydrocarbon is supplied to said catalytic reforming furnace in excess above the amount required stoichiometrically to yield said hydrogen and carbon monoxide, so that said gas containing hydrogen and carbon monoxide also contains unreformed methane,
   a portion of said hydrogen sulfide is burned with air to generate a combustion product containing sulfur dioxide,
   the remaining hydrogen sulfide and said sulfur dioxide are reacted by the Claus reaction to yield elemental sulfur, and
   the offgas from said Claus reaction constitutes at least a part of the fuel burned in said catalytic reforming furnace.

4. The process of claim 1 in which also said steps (a) and (b) are conducted in fluidized beds.

5. The process of claim 4 in which also
   a light hydrocarbon is reformed with steam in a catalytic reforming furnace to yield said gas containing hydrogen and carbon monoxide at a pressure greater than about 6 atmospheres,
   step (a) is conducted in at least two superposed fluidized beds operating adiabatically, the lowermost bed being fluidized by the gaseous product of said catalytic reforming furnace, and the flow of solid and gases through the several fluidized beds for conducting step (a) occurring in a counter-current manner, and
   step (b) is conducted in at least two superposed fluidized beds, at least one of the beds for step (b) being provided with cooling surface, the lowermost bed for step (b) being fluidized at least in major part by the gaseous reaction product from the uppermost bed for step (a), and the flow of solid and gases through the several fluidized beds for step (b) occuring in a counter-current manner.

References Cited

UNITED STATES PATENTS

| | | | |
|---|---|---|---|
| 2,740,691 | 4/1956 | Burwell | 23—181 |
| 2,970,893 | 2/1961 | Viles | 23—181 |
| 3,148,950 | 9/1964 | Mugg | 23—224 |

OSCAR R. VERTIZ, Primary Examiner

G. O. PETERS, Assistant Examiner

U.S. Cl. X.R.

23—181